H. C. ELVERS.
CHUCK.
APPLICATION FILED FEB. 12, 1921.
1,406,451.
Patented Feb. 14, 1922.
2 SHEETS—SHEET 2.
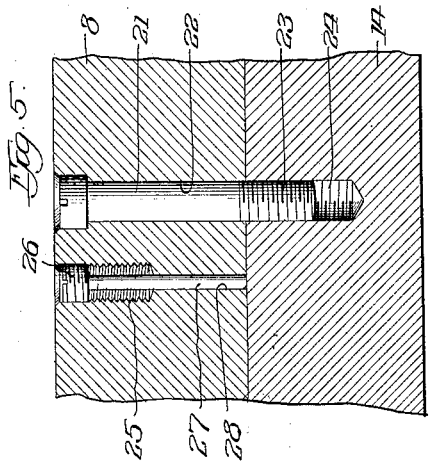
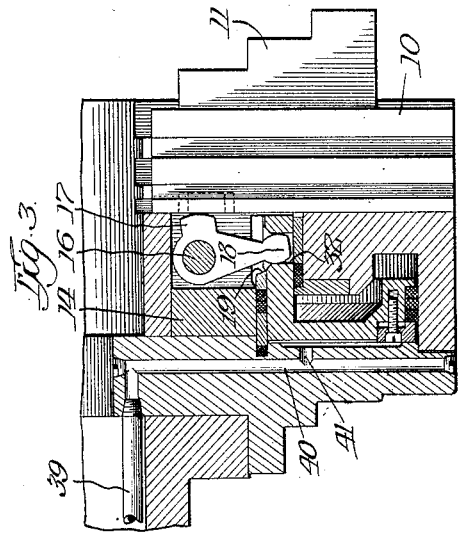
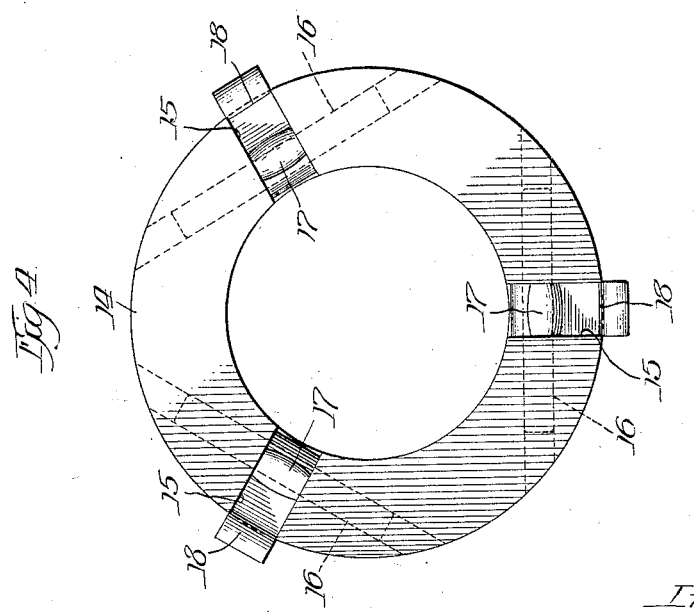
Inventor:
Hans C. Elvers,
By Pond + Wilson,
Attys.

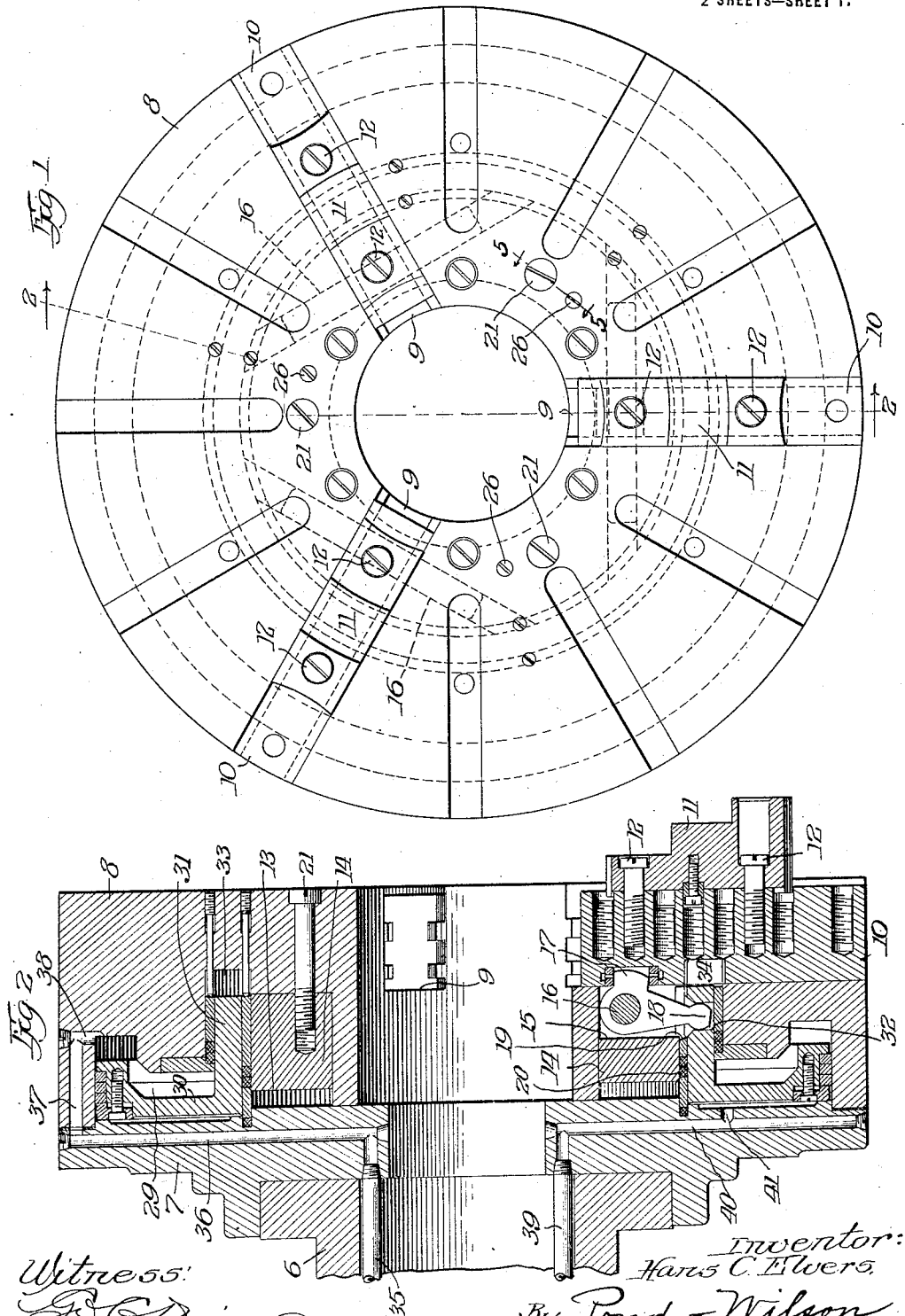

UNITED STATES PATENT OFFICE.

HANS C. ELVERS, OF MADISON, WISCONSIN, ASSIGNOR TO GISHOLT MACHINE COMPANY, OF MADISON, WISCONSIN, A CORPORATION OF WISCONSIN.

CHUCK.

1,406,451.  Specification of Letters Patent.  Patented Feb. 14, 1922.

Application filed February 12, 1921. Serial No. 444,335.

*To all whom it may concern:*

Be it known that I, HANS C. ELVERS, a citizen of the United States, residing at Madison, in the county of Dane and State of Wisconsin, have invented certain new and useful Improvements in Chucks, of which the following is a specification.

This invention relates to improvements in chucks for lathes and similar machines employing chucks, and, as to its principal features, relates to that type of chucks wherein the chuck jaws are actuated between gripping and release positions by elbow levers mounted in the chuck body.

One object of the present invention is to provide a chuck construction of this general type which shall make possible the disengagement of the elbow levers from the jaw bases to permit withdrawal of the latter from the chuck head by a simple outward sliding movement, and without necessitating any partial dismantling of the structure.

A further object of the invention is to provide an improved pneumatic operating mechanism for the elbow levers which in turn effect the work gripping movements of the chuck jaws; this mechanism, according to the present invention, taking the form of an annular piston mounted in the chuck head and operated by compressed air in both directions, said piston having a hub suitably slotted to receive the radial arms of the elbow levers.

Other objects and advantages of the invention will be apparent to those skilled in the art as the invention becomes better understood by reference to the following detailed description, taken in connection with the accompanying drawings, wherein I have illustrated one practical and approved embodiment of the invention, and in which—

Fig. 1 is a front elevation of a chuckhead embodying my present invention;

Fig. 2 is a diametric section on the line 2—2 of Fig. 1, showing the elbow levers operatively engaged with the bases of the jaws;

Fig. 3 is a fragmentary sectional view, showing the lower portion of Fig. 2 with the elbow levers disengaged from the jaw bases to permit removal of the latter from the slideways of the chuck head;

Fig. 4 is a plan view of the annular lever carrying block which is mounted in an annular chamber of the head and is adjusted inwardly to shift the jaw engaging lever arms out of engagement with the jaws; and Fig. 5 is a sectional detail on the line 5—5 of Fig. 1, illustrating the lever block adjusting means.

Since the present invention relates wholly to improvements in the chuck head and parts carried thereby, I have not herein deemed it necessary to illustrate in full the spindle, spindle bearings, and pneumatic pressure controlling devices; but I have shown at 6 the inner end of a tubular spindle, to which is attached the back-plate 7 of the chuck, this latter having mounted thereon the chuck body designated as an entirety by 8. The chuck body 8 is formed with the usual radial slideways 9, in which latter are mounted the jaw bases 10, carrying jaws 11 adjustably secured thereto by counter-sunk cap screws 12.

The chuck head 8 is cored to provide an annular chamber 13 that is co-axial with the chuck head; and in this chamber is slidably fitted an annular ring or block 14, shown in isolated detail in Fig. 4. The outer face of the block 14 is provided at equal spaced intervals with radial slots 15 corresponding in number and location to the slideways 9 of the chuck head and lying directly behind the latter. Fulcrumed on pivot pins 16 which extend crosswise of the slots 15 are a series of elbow levers, each of which has a short arm 17, that extends through the bottom of the slideway 9 and is operatively engaged with the jaw base 10, and a long arm 18 that extends radially of the chuck head through a slot 19 formed in a suitably packed ring 20 that forms the outer wall of the annular chamber 13.

When the annular block 14 is in its outermost position illustrated in Fig. 2, the short arm 17 of the elbow lever is operatively engaged with the jaw base 10. When, however, the annular block 14 is pushed inwardly to its innermost position illustratrated in Fig. 3, the short arm 17 of the elbow lever is retracted out of engagement with the jaw bases and below the plane of the bottom of the slideway, thus permitting the jaw base and jaw to be withdrawn by a simple outward sliding movement. To effect the outward and inward adjustment of the annular block 14 I have provided the simple means illustrated in Figs. 1 and 5, wherein 21 designates a screw bolt slidably engaged with a countersunk hole 22, formed in the chuck head, the inner portion of the screw bolt having a thread 23 engaged with a tapped hole 24 in the block 14. By turning the bolt 21, by the application of a screw driver, in one direction, the block 14 is drawn outwardly into engagement with the outer wall of its chamber 13, as shown in Fig. 2, and is held locked by the bolts 21 in such position. At one side of the hole 22 is a tapped hole 25 in the chuck head that is engaged by the threaded head 26 of a thrust pin or bolt 27, this latter being slidably engaged with a hole 28 extending from the bottom of the tapped hole 25 through the front wall of the chamber 13. To adjust the block 14 inwardly to the position shown in Fig. 3, the bolts 21 are first backed out, and the thrust pins 27 are, by the application of a screw driver, forced inwardly until the block 14 has been shifted to the bottom of its chamber 13. This, as above stated, disengages the elbow levers from the chuck jaws and allows the latter to be withdrawn by a simple outward sliding movement.

To re-establish the engagement of the levers with the jaws, the thrust pins 27 are backed out, and the screw bolts 21 are then screwed inwardly, thereby restoring the parts to the relative positions illustrated in Fig. 2.

Referring now to that feature of the invention which relates to the improved pneumatic lever operating mechanism, encircling the chamber 13 and block 14 is a second annular chamber 29, constituting an annular cylinder, in which is slidably mounted an annular piston 30. This piston 30 is formed with an outwardly extending sleeve or hub 31 that is slidably engaged with the ring 20 and is provided with radial slots 32 into which extend the outer ends of the long arms 18 of the elbow levers. To provide sufficient play for the hub 31 of the piston on its outward travel, the annular channel in which the hub 31 is mounted extends outwardly to a point somewhat beyond the bottoms of the slideways 9, as shown at 33 in Fig. 2; and each of the jaw bases 10 is provided on its inner side with a transverse slot 34 registering with the outer portion 33 of said channel, the slots 34 being of sufficient width to permit the travel of the jaws caused by the swinging movements of the elbow levers.

Compressed air from a suitable source is supplied to and exhausted from the forward face of the piston 30 through a pipe 35 and ducts 36, 37 and 38, drilled in the back-plate 7 and chuck body 8; and compressed air is supplied to and exhausted from the rear side of the piston 30 through a pipe 39, and ducts 40 and 41 drilled in the back-plate.

With the parts in the relative position shown in Fig. 2, and with the work suitably chucked in the jaws, the latter are forced inwardly into tight holding engagement with the work by admitting compressed air through the pipe 39 to the rear of the piston 30 and simultaneously exhausting through the pipe 35 the air from the front of the piston. Manifestly, when the work is to be released from the chuck, or when a piece of work is to be internally chucked by the outer ends of the jaws, the latter are forced outwardly by admitting the compressed air through the pipe 35 to the front side of the piston and simultaneously exhausting the air from the rear side of the piston through the pipe 39.

It is believed that the foregoing description, taken in connection with the drawings, will make clear to persons skilled in the art the novel structural features and the mechanical principles upon which the invention is based; and while I have herein set forth one practical and operative embodiment of the principles involved, it should be understood that the structural features may be considerably modified in detail without departing from the principles or sacrificing any of the advantages of the invention. Hence, I reserve all such variations and modifications as fall within the spirit and purview of the appended claims.

I claim:

1. A chuck having a body portion formed with radial slideways and with a chamber in rear of said slideways, a block mounted in said chamber and movable between the front and rear walls thereof, levers pivoted in said block, jaw carriers engaged with said slideways and slotted to engage with said levers, and means for shifting said block in said chamber to thereby engage said levers with, and disengage them from, said jaw carriers.

2. A chuck having a body portion formed with radial slideways and with an annular chamber in rear of said slideways, an annular block mounted in said chamber and slidable between the front and rear walls thereof, radially disposed elbow levers pivoted in said block, jaw carriers engaged with said slideways and slotted to engage with the forwardly extending arms of said elbow levers, and means for shifting said block forwardly and rearwardly in said chamber and securing it in either position to thereby engage said levers with, and disengage them from, said jaw carriers.

3. A chuck having a body portion formed with radial slideways and with an annular chamber in rear of said slideways, an annular block mounted in said chamber and slidable between the front and rear walls thereof, radially disposed elbow levers pivoted in said block, jaw carriers engaged with said slideways and slotted on their undersides to articulate with the forwardly extending arms of said elbow levers, draw bolts mounted in said body portion and having threaded engagement with said block to thereby shift the latter outwardly to, and secure it in, a position wherein said levers engage with the slots of said jaw carriers, and thrust bolts having threaded engagement with said body portion and bearing at their inner ends on said block to thereby shift the latter inwardly to, and secure it in, a position wherein said levers are disengaged from said jaw carriers.

4. A chuck having a body portion formed with radial slideways and with an annular cylinder in rear of said slideways, jaws carriers mounted in said slideways, elbow levers pivoted in said body portion and each having a forwardly extending arm operatively engaged with one of said jaw carriers and an outwardly extending radial arm, an annular piston fitted to said cylinder, said piston having a hub encircling said levers and operatively engaged with the outer ends of the radial arms of the latter, and means for admitting and exhausting motive fluid to and from the opposite faces of said piston.

5. A chuck having a body portion formed with radial slideways and with an annular cylinder in rear of said slideways, jaw carriers mounted in said slideways, elbow levers pivoted in said body portion and having forwardly extending arms articulated with said jaw carriers near the inner ends of the latter, and outwardly extending radial arms, an annular piston fitted to said cylinder, said piston having a sleeve-like hub provided with transverse slots receiving the outer ends of the radial arms of said levers, and means for admitting and exhausting motive fluid to and from the opposite faces of said piston.

6. A chuck having a body portion formed with radial slideways, a chamber in rear of said slideways, and an annular cylinder encircling said chamber, a block mounted in said chamber and shiftable between the front and rear walls thereof, radially disposed elbow levers pivoted in said block, jaw carriers engaged with said slideways and slotted to engage with forwardly extending arms of said levers, means for shifting said block in said chamber to thereby engage said levers with, and disengage them from, said jaw carriers, an annular piston fitted to said cylinder, said piston having a sleeve-like hub encircling said block and slotted to engage with the other arms of said levers, and means for admitting and exhausting motive fluid to and from the opposite faces of said piston.

HANS C. ELVERS.